United States Patent
Petrucci et al.

(10) Patent No.: US 7,015,493 B2
(45) Date of Patent: Mar. 21, 2006

(54) REGIONAL IMAGE PROCESSING DEFAULT PARAMETERS

(75) Inventors: John L. Petrucci, Rochester, NY (US); Keiichi Funaki, Tokyo (JP); Mark P. Kirk, Carcare (IT); Kevin C. Odorczyk, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 127 days.

(21) Appl. No.: 10/771,215

(22) Filed: Feb. 3, 2004

(65) Prior Publication Data

US 2004/0206884 A1    Oct. 21, 2004

Related U.S. Application Data

(60) Provisional application No. 60/444,594, filed on Feb. 3, 2003.

(51) Int. Cl.
*A61B 6/00* (2006.01)

(52) U.S. Cl. .................... 250/581; 250/208.1; 250/580

(58) Field of Classification Search ................ 250/580, 250/208.1, 581
See application file for complete search history.

(56) References Cited

U.S. PATENT DOCUMENTS

RE31,847 E      3/1985   Luckey
5,270,530 A  *  12/1993  Godlewski et al. ...... 250/208.1

* cited by examiner

*Primary Examiner*—David Porta
*Assistant Examiner*—Mary Zettl
(74) *Attorney, Agent, or Firm*—Susan L. Parulski

(57) ABSTRACT

A method of configuring a storage phosphor reader. The method comprises the steps of: providing a database of user-selectable image processing parameters wherein the image processing parameters are grouped by geographical region; allowing an operator of the storage phosphor reader to select one of the groups of geographical regions; and applying the image processing parameters of the selected group to the storage phosphor reader to configure the reader with the image processing parameters of the selected group.

1 Claim, 3 Drawing Sheets

| ABDOMEN | ABDOMEN GENERAL | ANKLE | OTHER | CHEST |
| --- | --- | --- | --- | --- |
| CRANIUM | CSPINE | ELBOW | EXTREMITY | FACIAL BONES |
| FEMUR | FIBULA | FOOT | FOREARM | HAND |
| HIP | HUMERUS | JOINT | KNEE | LONGBONE |
| LSPINE | NASAL BONES | PATTERN | PELVIS | PORTABLE CHEST |
| SHOULDER | SKULL | SPINE | THORAX | TSPINE |
| WRIST | PEDIATRIC ABDOMEN | PEDIATRIC CHEST | DENTAL | SOFT TISSUE |

REGIONAL IMAGE PROCESSING DEFAULT PARAMETERS

CROSS REFERENCE TO RELATED APPLICATIONS

This is a 111A application of Provisional Application Ser. No. 60/444,594 filed on Feb. 3, 2003.

FIELD OF THE INVENTION

This invention relates in general to computed radiography (CR) and storage phosphor imaging system, and more particularly to providing regionally default image processing parameters for such systems.

BACKGROUND OF THE INVENTION

Storage phosphor imaging systems are known. In one such system, a storage phosphor is exposed to an x-ray image of an object, such as a body part of a patient, to record a latent x-ray image in the storage phosphor. The latent x-ray image is read out by stimulating the storage phosphor with stimulating radiation. Upon stimulation, the storage phosphor releases emitted radiation of a particular wavelength. To produce a signal useful in electronic image processing, the storage phosphor is scanned, for example, by a laser beam deflected by an oscillating or rotating scanning mirror or by a rotation hologon. The emitted radiation from the storage phosphor is reflected by a collector and detected by a photodetector, such as a photomultiplier, to produce an electronic x-ray image signal. The x-ray image signal can then be viewed as a visual image produced by a softcopy display device, such as a CRT or LCD display, or a hardcopy display device, such as a x-ray film printer (laser printer, CRT printer, thermal printer). U.S. Pat. No. Re. 31,847 (Luckey) discloses a storage phosphor system. The reader is often referred to as a computed radiography (CR) reader.

Such computer radiography (CR) systems and storage phosphor systems are employed in many countries around the world. Accordingly, there exists a need for a system and method for readily setting-up and configuring the CR imaging processing system at their particular location.

SUMMARY OF THE INVENTION

An object of the present invention is to provide a method of configuring a reader.

Another object of the present invention is to provide such a method which optimizes the reader for preferred use.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method of configuring a storage phosphor reader. The method comprises the steps of: providing a database of user-selectable image processing parameters wherein the image processing parameters are grouped by geographical region; allowing an operator of the storage phosphor reader to select one of the groups of geographical regions; and applying the image processing parameters of the selected group to the storage phosphor reader to configure the reader with the image processing parameters of the selected group.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIG. 2 shows a table listing 35 body parts for which image processing parameters would be associated.

DETAILED DESCRIPTION OF THE INVENTION

Figure 1:
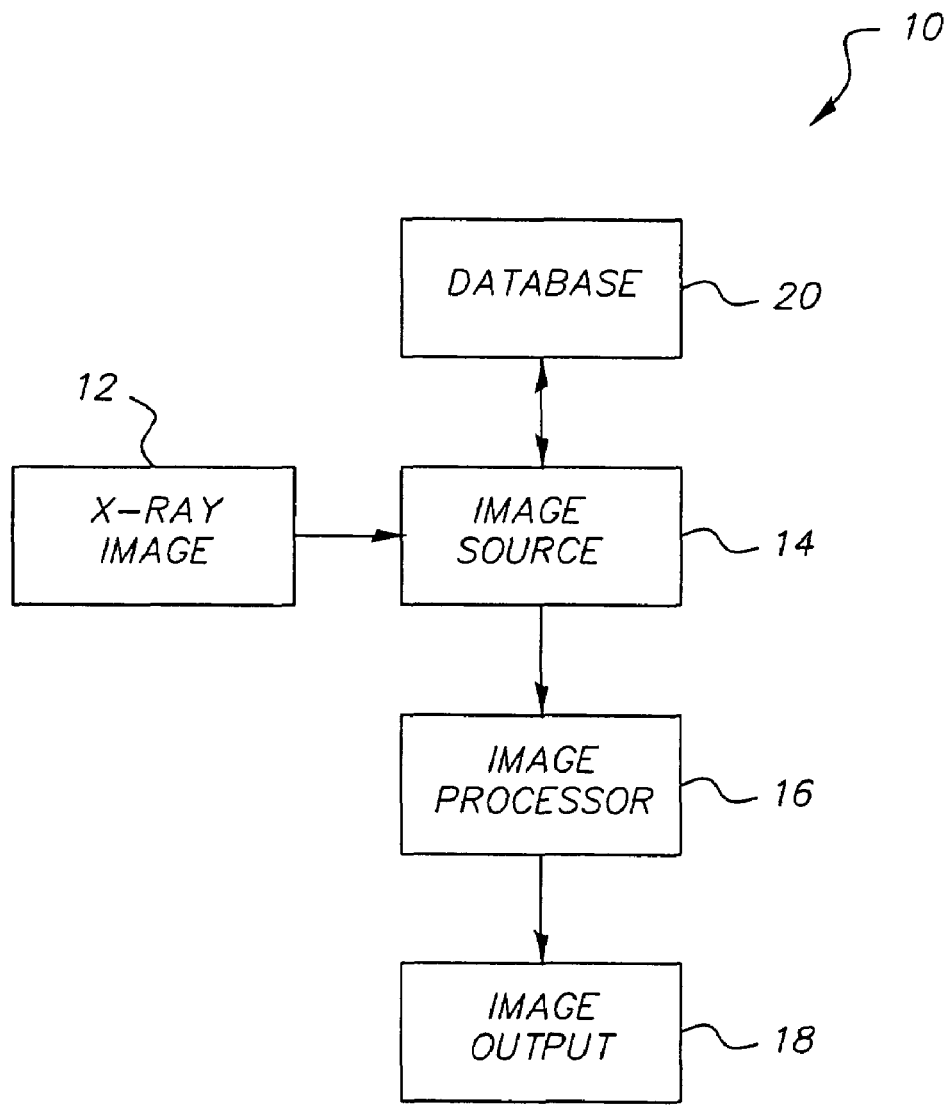
FIG. 1 shows a block diagram of a digital imaging system incorporating the method of the present invention.

The following is a detailed description of the preferred embodiments of the invention, reference being made to the drawings in which the same reference numerals identify the same elements of structure in each of the several figures.

Referring to FIG. 1 there is shown an imaging system 10 which incorporates the method of the present invention. As shown, system 10 includes an x-ray medical image 12 and a source 14 for the medical image. For Applicant's particular application, image 12 is a storage phosphor and source 14 is a storage phosphor reader which converts the x-ray image stored in storage phosphors into digital radiographic images. Other known sources can also be within the scope of the invention, for example, a medical image modality (e.g., CT MRI, PET, US diagnostic scanner), a transmission channel (e.g., telephone, cable, internet), and a film digitizer. The medical image from source 14 is processed in image processor 16. Processor 16 is preferably a digital computer, but can include hardware and software systems. A digital computer can include a digital processor, storage, a display, input devices such as a mouse and keyboard. The processed digital image is sent to an image output 18 such as an electronic display (CRT, LCD) or a hard copy printer (for example, film, laser, ink jet, electrophotographic, thermal, dye transfer).

For Applicant's particular application, the storage phosphor (CR) reader includes a set of image processing parameters for each particular/unique body part. This set of image processing parameters are employed when source 14 (i.e., the reader) converts the x-ray image stored in storage phosphors into digital radiographic images. These image processing parameters are typically stored in software in a database 20 accessible by source 14. Such a database can be local to source 14 or remote (for example, accessible by means of the internet).

The image processing parameters render the images to a particular "look". That is, the image processing parameters affect the generation of the tone scale. The tone scale of a digital image is responsible for controlling the contrast and brightness characteristics of the image, and is manifested in the form of a look-up table (LUT) that maps the input pixel values of the image to the appropriate output representation such as density or luminance.

It is not the intention here to teach or invent methods of transforming the image data and the employment of LUTs, therefore it will be appreciated that such methods are known in the art.

Image processing parameters are known to those skilled in the art. For example, processing parameters which relate to Ptone can include: Average Signal to Noise, Lower Level Crossings, Upper Level Crossings, Activity Threshold, High Density, Low Density, Left Point Threshold, Gamma Min, Gamma Max, Average Density, Contrast Factor, High Cut Offset (Shoulder), Cut Offset (Toe), Lower Contrast, and Upper Contrast. Image processing parameters employed to enhance the detail of image can include Density Code Value, Kernel Size, Gain, and On/Off Flag. Image processing parameters employed to enhance the sharpness of image can include Kernel Size, Low Boost, High Boost, Linear Transition, and Linear Transition End Point.

The image processing parameters are associated with a particular body part. FIG. 2 shows a table listing 35 body parts for which image processing parameters would be associated. Further, the image processing parameters are associated with a particular exam, also referred to as a projection, for each of the body parts. Examples of 13 projections include: AP (Anterior-Posterior), PA (Posterior-Anterior), LAO (Lateral Anterior Oblique), LPO (Left Posterior Oblique), Lateral, LL (Left Lateral), LLD, RAO (Right Anterior Oblique), RPO (Right Posterior Oblique), RL (Right Lateral), RLD, X-ray Table, and Other.

Accordingly, with 35 body parts and 13 projections, a total of 455 bodypart/projection combinations are possible, wherein each combination can include a set of 30 image processing parameters which are defined for each combination.

During set up/configuration of the reader, these image processing parameters are defined/identified and adjusted for each reader. Because of the large number of bodypart/projection combinations, the setup/configuration of the image processing parameters can be cumbersome and time consuming.

Applicants have noted that particular geographic regions/areas have particular preferred style of image processing. The geographic region might be a country, for example Japan, a metropolitan area, for example Los Angeles, or a locale, for example western Europe.

For example, western Europe may typically generate an output in hard copy form, so therefore, the image processing parameters are optimized for hard copy output. In contrast, eastern Europe may typically view the output in software copy form (i.e., on a monitor/display). As such, the image processing parameters for eastern Europe would preferably be optimized for soft copy output. In another example, Japan radiologists may prefer high exposure images as compared to western Europe radiologists who typically prefer low exposure images. The image processing parameters would be set accordingly for such preferences.

The present invention provides a regionally optimized default set of image processing parameters which can be provided at time of setup/configuration of the reader. That is, from Applicant's observation that particular geographic regions/areas have particular preferred style of image processing, Applicant has developed a default set of image processing parameters that are regionally optimized.

Previous to the present invention, in order to setup/configure the image processing parameters, a visit to the customer site was required to put these preferences in place by hand. With the present invention, the product software can include the preferred regional defaults and the product software can include means to select the preferred regional defaults.

As such, the present invention provides the convenience of having default image processing parameters that are tailored to particular regions of the world already resident on the system thereby eliminating a manual process. In addition, the present invention simplifies the setup/configuration of the CR image processing in the global marketplace. Still further, the present invention reduces the need for an application consultant to go on site to tune image processing parameters, saving the time/cost to set up the system.

The operator can be prompted during the product software installation to allow the operator to select a default parameter, thereby automating the selection process.

Figure 3:
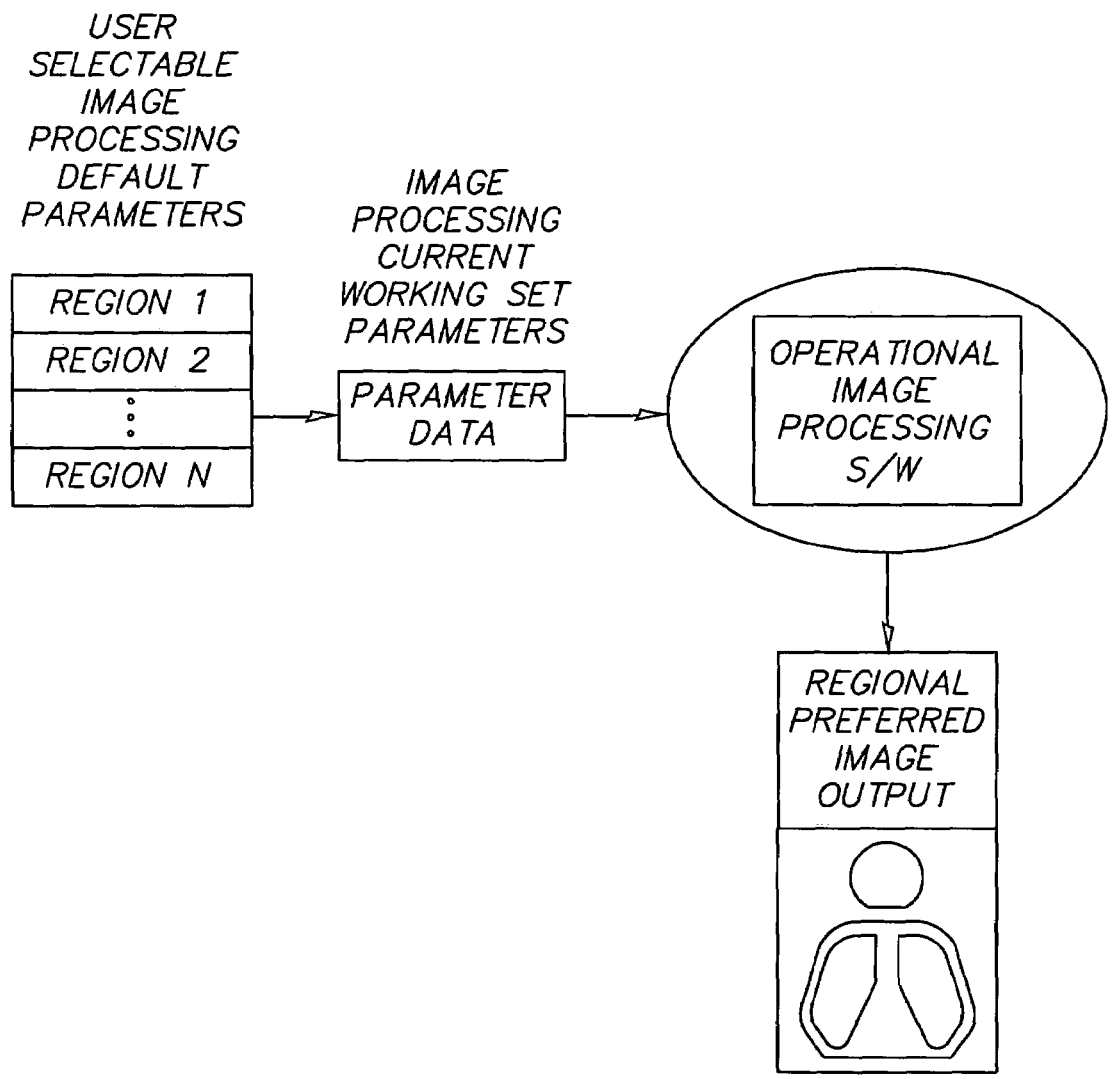
FIG. 3 shows a block diagram illustrative of the method of the present invention.

Referring to FIG. 3, the present invention is more particularly illustrated. A database of user-selectable image processing default parameters is provided/grouped by geographical region. For example, Region 1 might be "western Europe", Region 2 might be "Japan", and Region 3 might be "greater Los Angeles metropolitan area".

During setup/configuration of the reader, the operator selects the appropriate regional location of the reader. A database is accessed to obtain the corresponding default image processing parameters for the selected region. As indicated above, the database can be local or remote. The database can be database 20 as shown in FIG. 1.

The database of parameters is accessed by the image processing software of the reader. Once accessed, the image processing parameters of the selected group are applied to the reader. Once applied, the reader processes the images in accordance with the parameters to optimize the output to the regional preferred image output.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

10 system
12 x-ray image
14 source
16 image processor
18 image output
20 database

What is claimed is:

1. A method of configuring a storage phosphor reader, comprising the steps of:

providing a database of user-selectable image processing parameters wherein the image processing parameters are grouped by geographical region;

allowing an operator of the storage phosphor reader to select one of the groups of geographical regions; and applying the image processing parameters of the selected group to the storage phosphor reader to configure the reader with the image processing parameters of the selected group.

* * * * *